(12) United States Patent
Miyakawa et al.

(10) Patent No.: US 8,976,370 B2
(45) Date of Patent: Mar. 10, 2015

(54) MEASURING APPARATUS, IMPRINT SYSTEM, MEASURING METHOD, AND DEVICE MANUFACTURING METHOD

(71) Applicant: Canon Kabushiki Kaisha, Tokyo (JP)

(72) Inventors: Takahiro Miyakawa, Utsunomiya (JP); Kazuhiro Sato, Utsunomiya (JP); Ken Minoda, Utsunomiya (JP); Hideki Ina, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/086,132

(22) Filed: Nov. 21, 2013

(65) Prior Publication Data

US 2014/0153003 A1 Jun. 5, 2014

(30) Foreign Application Priority Data

Nov. 30, 2012 (JP) ................................. 2012-263515

(51) Int. Cl.
*G01B 11/28* (2006.01)
*G01B 11/06* (2006.01)

(52) U.S. Cl.
CPC ........ *G01B 11/0616* (2013.01); *G01B 11/0633* (2013.01)
USPC ....................................................... 356/630

(58) Field of Classification Search
CPC ........... G01B 11/0625; G01B 11/0683; G01B 11/06; B24B 37/013; B24B 49/12

USPC ......................................................... 356/630
See application file for complete search history.

(56) References Cited

U.S. PATENT DOCUMENTS

2008/0216956 A1* 9/2008 Nakamoto et al. ....... 156/345.25
2008/0241601 A1* 10/2008 Moriwaki et al. ............ 428/836

FOREIGN PATENT DOCUMENTS

| JP | 2007-311469 A | 11/2007 |
| JP | 2009-162494 A | 7/2009 |
| JP | 2012-019111 A | 1/2012 |
| JP | 2012-129313 A | 7/2012 |

* cited by examiner

*Primary Examiner* — Tarifur Chowdhury
*Assistant Examiner* — Md Rahman
(74) *Attorney, Agent, or Firm* — Canon USA, Inc. IP Division

(57) ABSTRACT

An measuring apparatus includes: a storage unit configured to store a relationship, regarding an irradiation condition predetermined based on a correlation between a characteristic of each of beams of reflected light obtained from a plurality of patterns different from one another in a thickness of a residual layer in a recessed portion and the thickness of the residual layer of each of the plurality of patterns, between the characteristic of the reflected light from each pattern and the thickness of the residual layer of the pattern; and a processing unit configured to, based on a characteristic of reflected light from a pattern formed on a substrate irradiated with light under the irradiation condition and the relationship stored in the storage unit, obtain a thickness of a residual layer in a recessed portion of the pattern formed on the substrate.

16 Claims, 3 Drawing Sheets

MEASURING APPARATUS, IMPRINT SYSTEM, MEASURING METHOD, AND DEVICE MANUFACTURING METHOD

BACKGROUND OF THE INVENTION

1. Field of the Invention

One disclosed aspect of the embodiments relates to a measuring apparatus, an imprint system, a measuring method, and a device manufacturing method that measure the thickness of a residual layer of a pattern formed on a substrate.

2. Description of the Related Art

An imprint technique is a technique for, in the state where an imprint material (resin) supplied onto a substrate (a wafer) is brought into contact with a mold on which a pattern has been formed, curing the resin to form the pattern in the resin on the wafer.

In the imprint technique, after the pattern has been formed on the substrate, a thin resin layer called a ""residual layer"" remains. This requires the step of removing the residual layer by etching. In the step of removing the residual layer, also the pattern formed in the resin is etched together with the residual layer. The etching should not be performed more than necessary so that the pattern formed in the resin is influenced as little as possible. To that end, it is necessary to accurately measure the thickness of the residual layer.

As a method of measuring the thickness of a residual layer, scatterometry is known. Scatterometry is a technique for measuring the shape of a pattern by applying an optical simulation of the reflected light from a structural birefringent body. Such a method of measuring the shape of a pattern using scatterometry is described in Japanese Patent Application Laid-Open No. 2007-311469 and Japanese Patent Application Laid-Open No. 2009-162494.

Scatterometry checks the spectral characteristics of the reflected light from a measurement object obtained by irradiating the measurement object with light, against the spectral characteristics of the reflected light obtained by numerical analysis by modeling the measurement object, thereby estimating the periodic structure of the measurement object. Scatterometry includes a method using a library and a method without using a library. The library is a database in which the shapes of periodic structures and the spectral characteristics of beams of reflected light are accumulated in association with each other, and is created using an optical simulation such as rigorous coupled-wave analysis (RCWA). The spectral characteristics that best match the measured spectral characteristics are searched for in the library, and data of the shape of the periodic structure associated with the obtained spectral characteristics is determined as the shape of the measurement object. If a measurement object has a periodic structure, scatterometry can measure the shape of the measurement object with high accuracy.

The pattern formed by imprinting, however, does not necessarily have a periodic structure. If the shape of the pattern formed on the substrate does not have a periodic structure, the conventional method of measuring the thickness of a residual layer using scatterometry cannot measure the shape of the pattern with high accuracy.

Further, as a method of measuring the characteristics of a thin layer of a measurement object, ellipsometry is known. Ellipsometry is a technique capable of measuring the layer thickness of a measurement object by irradiating the measurement object with incident light and measuring the polarization state of the reflected light from the measurement object.

The conventional measurement using ellipsometry, however, does not measure the thickness of a residual layer in a recessed portion of a pattern formed by imprinting. Thus, it is not possible to measure with high accuracy the thickness of a residual layer in a recessed portion of a pattern formed by imprinting.

SUMMARY OF THE INVENTION

One disclosed aspect of the embodiments is directed to a technique that is advantageous in measuring the thickness of a residual layer in a recessed portion of a pattern formed on a substrate.

According to an aspect of the embodiments, a measuring apparatus for, based on a characteristic of reflected light obtained by irradiating with light a pattern formed on a substrate, obtaining a thickness of a residual layer in a recessed portion of the pattern formed on the substrate includes: a storage unit configured to store a relationship, regarding an irradiation condition predetermined based on a correlation between a characteristic of each of beams of reflected light obtained from a plurality of patterns different from one another in a thickness of a residual layer in a recessed portion and the thickness of the residual layer of each of the plurality of patterns, between the characteristic of the reflected light from each pattern and the thickness of the residual layer of the pattern; and a processing unit configured to, based on the characteristic of the reflected light from the pattern formed on the substrate irradiated with light under the irradiation condition and the relationship stored in the storage unit, obtain the thickness of the residual layer in the recessed portion of the pattern formed on the substrate.

Further features of the disclosure will become apparent from the following description of exemplary embodiments with reference to the attached drawings.

DESCRIPTION OF THE EMBODIMENTS

Figure 1:
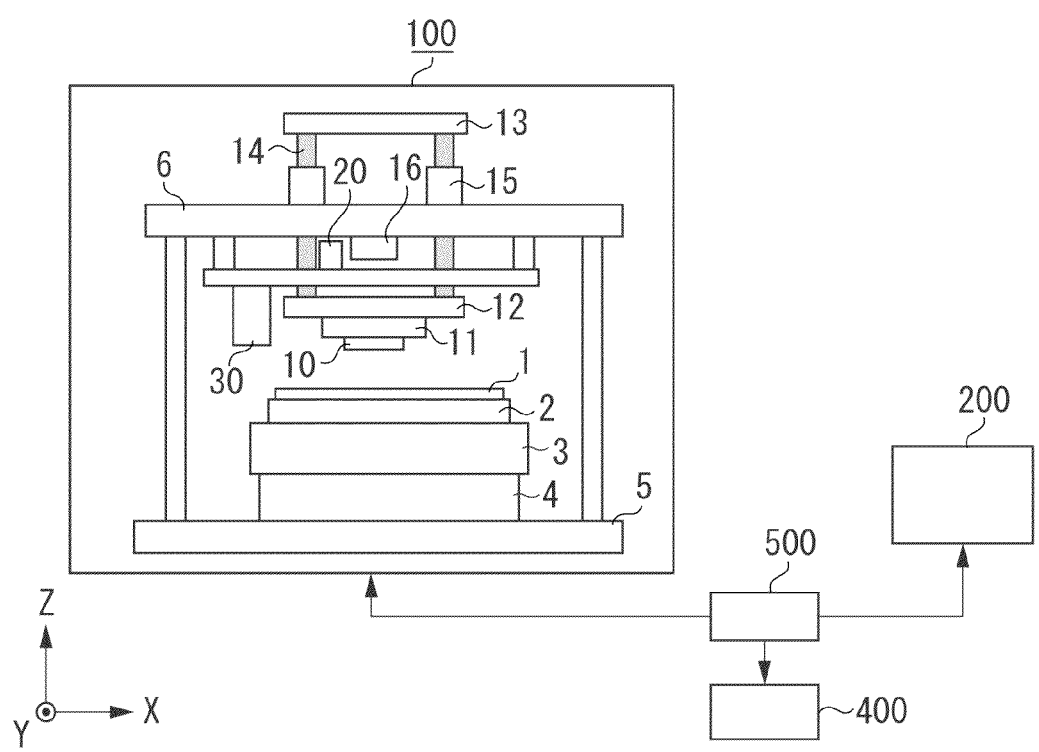
FIG. 1 is a diagram illustrating the configuration of an imprint apparatus according to an exemplary embodiment.

With reference to FIG. 1, an imprint apparatus 100 is described. As illustrated in FIG. 1, axes are defined such that a plane on which a wafer 1 is placed is an XY plane, and a direction orthogonal to the XY plane is a Z-direction. The imprint apparatus 100 includes a wafer chuck 2, which holds the wafer 1 serving as a substrate, a fine adjustment stage 3, and an XY stage 4.

The fine adjustment stage 3 has the function of correcting the rotation of the wafer 1 about the Z-axis, the function of adjusting the position of the wafer 1 in the Z-direction, and a tilt function of correcting the tilt of the wafer 1. The XY stage 4 has the function of positioning the wafer 1 in the X-direction and the Y-direction. Hereinafter, the fine adjustment stage 3 and the XY stage 4 are collectively referred to as a ""wafer stage"". The wafer chuck 2 is held by the wafer stage, and the wafer stage is further supported by a base surface plate 5.

The imprint apparatus 100 further includes a mold chuck 11, which holds a mold 10 (an original or a template) by a mechanical holding method, a mold chuck stage 12, a light source 16, an alignment scope 20, and a supply unit 30."

On the surface of the mold 10, a recessed and raised pattern is formed. The mold chuck 11 is held by the mold chuck stage 12 by a mechanical holding method. The mold chuck stage 12 has the function of correcting the rotation of the mold 10 about the Z-axis, and a tilt function of correcting the tilt of the mold 10.

The mold chuck stage 12 is fixed to one end of each of guide bars 14 that pass through a top plate 6. The other ends of the guide bars 14 are fixed to a guide bar plate 13. The guide bars 14 move in the Z-direction by actuators 15 including an air cylinder and a linear motor to lift and lower the mold 10. The guide bars 14 move in the Z-direction, whereby it is possible to press the mold 10, held by the mold chuck 11, against the wafer 1 or pull the mold 10 away from the wafer 1.

To the fine adjustment stage 3 and the mold chuck stage 12, reference mirrors (not illustrated) are attached to measure positions in the X-direction and the Y-direction. A laser interferometer irradiates each reference mirror with light and detects the light reflected by the reference mirror. Thus, the laser interferometer can measure the positions of the fine adjustment stage 3 and the mold chuck stage 12.

The alignment scope 20 is a through-the-mold (TTM) alignment scope for alignment measurement having an optical system and an image sensor, and detects alignment marks provided on the wafer 1 and the mold 10 or moiré fringes formed by the alignment marks. Based on the detection, it is possible to obtain a relative positional deviation between the wafer 1 and the mold 10 in the X-direction and the Y-direction.

The supply unit 30 supplies resin serving as an imprint material to the surface of the wafer 1. Specifically, the supply unit 30 is a dispenser head (a resin application unit) including a resin dripping nozzle, which drips resin on the wafer 1. In the state where the resin supplied onto the wafer 1 is in contact with the mold 10, the light source 16 emits ultraviolet light (curing light) that cures the resin. As the resin, a light-curable resin, which is cured by irradiating the light-curable resin with ultraviolet light, is used. Thereafter, the cured resin and the mold 10 are pulled away from each other. As described above, it is possible to form a resin pattern on the wafer 1. The light source 16 emits ultraviolet light, but the wavelength of the light from the light source 16 can be appropriately determined according to the resin to be supplied onto the wafer 1.

In each of the mold chuck 11 and the mold chuck stage 12, an opening is formed to illuminate the mold 10 with the light from the light source 16. The imprint apparatus 100 may further include a height measuring apparatus (not illustrated) to measure the height and the tilt of the wafer 1 held by the wafer chuck 2.

If a pattern has been formed on (transferred onto) the wafer 1 using the imprint apparatus 100, a thin resin layer termed a residual layer remains in a recessed portion of the pattern. Thus, it is necessary to remove the residual layer by etching.

As a result of the etching, however, not only the residual layer but also a raised portion of the pattern formed on the wafer 1 is etched, which influences the pattern shape. The pattern shape is represented by indicators such as a critical dimension (hereinafter abbreviated as "CD"), a side wall angle (hereinafter abbreviated as "SWA"), and a height (hereinafter abbreviated as "HT").

When a pattern is formed in a plurality of shot areas on the wafer 1 by an imprint operation, it is desired that the residual layer thickness (hereinafter abbreviated as "RLT") should be uniform throughout the plurality of shot areas. If the RLT is not uniform throughout the plurality of shot areas, the shape of a pattern to be obtained after the etching is not uniform throughout the plurality of shot areas, either. Further, if the RLT is not uniform in a shot area, the shape of a repetitive pattern to be obtained after the etching is not uniform in the shot area.

If the pattern shape, which functions as an etching mask, is non-uniform, the pattern shape (for example, the critical dimension) of the resulting semiconductor device is nonuniform, which may influence the characteristics of the device. The RLT is desired to be uniform on the wafer 1, and therefore, it is necessary to measure the RLT with high accuracy.

Figure 2:
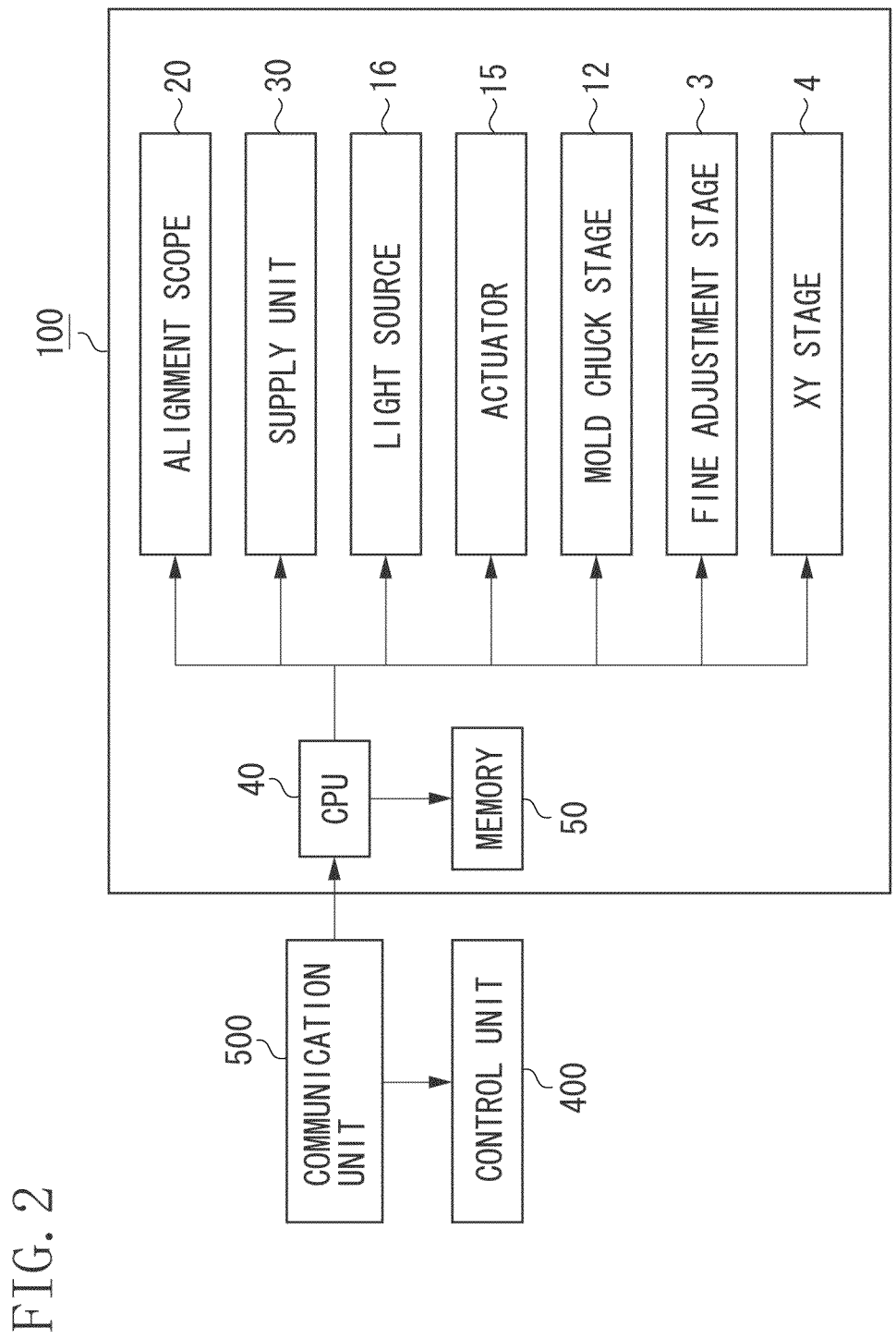
FIG. 2 is a control block diagram illustrating the imprint apparatus according to an exemplary embodiment.
Figure 3:
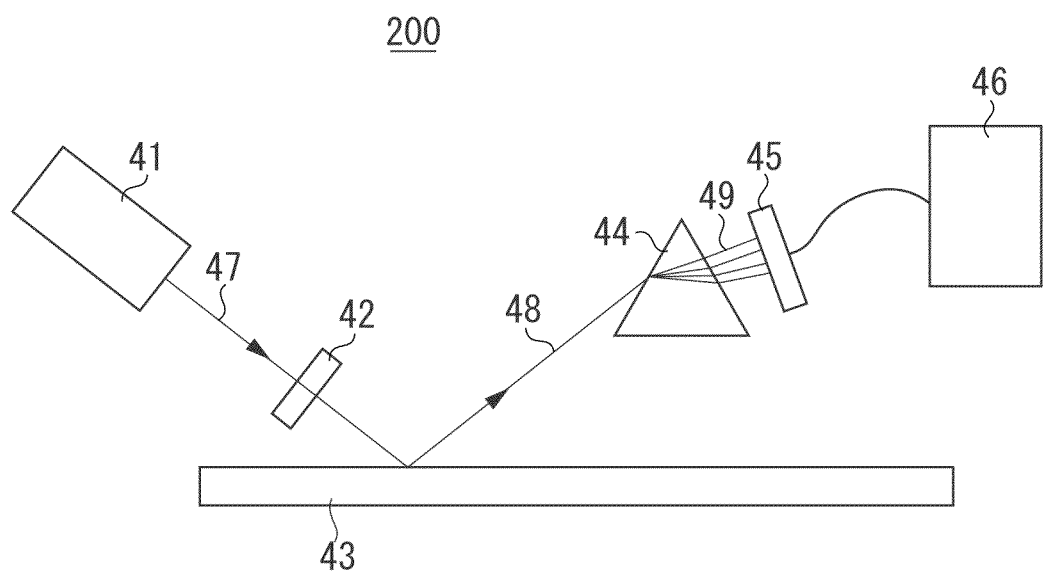
FIG. 3 is a diagram illustrating an optical system of an ellipsometer according to an exemplary embodiment.

In an exemplary embodiment, a novel measuring method is used to measure the RLT with high accuracy. As the method of measuring the RLT according to the exemplary embodiment, a method of measuring a residual layer using ellipsometry is described below. With reference to FIGS. 1, 2, and 3, the measuring method according to the exemplary embodiment is described. FIG. 1 is a diagram illustrating the configuration of a system including the imprint apparatus 100 and a spectroscopic ellipsometer 200 according to the present exemplary embodiment. FIG. 2 is a control block diagram illustrating the imprint apparatus 100 according to the present exemplary embodiment.

The imprint apparatus 100 in FIG. 1 is as described above. The spectroscopic ellipsometer 200 is a layer thickness measuring apparatus using spectroscopic ellipsometry. In the present exemplary embodiment, the spectroscopic ellipsometer 200 is used to inspect the wafer 1 on which a resin pattern has been formed, thereby measuring the residual layer thickness.

The imprint apparatus 100 includes a control unit 400 and a communication unit 500 and is connected to the spectroscopic ellipsometer 200 via the communication unit 500. The control unit 400 has the function of controlling the entire imprint process and setting the operating condition of the imprint apparatus 100 based on information of the residual layer thickness measured using the spectroscopic ellipsometer 200.

FIG. 2 is a control block diagram illustrating a control block that controls the imprint apparatus 100. A central processing unit (CPU) 40 (a central control apparatus) functions as a control unit that controls together the components of the imprint apparatus 100 described in FIG. 1, such as the actuators 15 and sensors, to cause the components to perform predetermined operations. A memory 50 (a storage unit) stores the relationship between the phase difference and the residual layer thickness detected by the spectroscopic ellipsometer 200. This relationship may be stored in a storage unit of the spectroscopic ellipsometer 200.

With reference to FIG. 3, the spectroscopic ellipsometer 200 is described. FIG. 3 illustrates an example of an optical system of the layer thickness measuring apparatus using ellipsometry (the spectroscopic ellipsometer 200). Ellipsometry includes a method of using light of a plurality of wavelengths (broadband light) as incident light to disperse and detect the wavelengths of the reflected light, and a method of using single-wavelength light as incident light to change the angle of incidence. FIG. 3 illustrates the first method, which measures the layer thickness using light of a plurality of wavelengths. Such a method of dispersing and detecting the wavelengths of reflected light is referred to as "spectroscopic ellipsometry".

Ellipsometry is a measuring method of examining the characteristics of a thin layer using polarized light. If a measurement object has been irradiated with incident light, the polarization state of the reflected light from the measurement object (measurement-object-reflected light) changes. The incident light includes a component having an electric field component parallel to the plane of incidence (P-polarization), and a component having an electric field component perpendicular to the plane of incidence (S-polarization). P-polarized light and S-polarized light behave differently from each other on the surface of a material, and, therefore, the polarization state of the reflected light is different from the polarization state of the incident light. The difference between the incident light and the reflected light is represented using the intensity ratio of the P-polarized light to the S-polarized light and the phase difference between the P-polarized light and the S-polarized light.

Ellipsometry measures at least one of the intensity ratio and the phase difference. The thickness of the thin layer is obtained from the intensity ratio and the phase difference, using a model (an equation) describing the interaction between the thickness of the thin layer and the measurement light and an algorithm. There is a correlation (a correspondence relationship) between the thickness of the thin layer and the reflected light. Thus, it is possible to obtain a relational expression describing the interaction. When, however, the thickness of the residual layer formed by the imprint apparatus 100 is measured, a pattern having an aperiodic structure is formed on the residual layer. Thus, there is not necessarily a correlation between the thickness of the residual layer and the reflected light. In response, it is necessary to examine whether or not there is a correlation between the thickness of the residual layer of the pattern having an aperiodic structure and the reflected light.

First, the spectroscopic ellipsometer 200, which irradiates the measurement object with light and detects the reflected light (measurement-object-reflected light), is described. The spectroscopic ellipsometer 200 includes a light source 41, a polarizer 42, a spectroscopic optical system 44, and a photodetector 45. Incident light 47 emitted from the light source 41 passes through the polarizer 42 (a polarizing plate), which is rotatable, thereby adjusting the planes of polarization (S-polarization and P-polarization) of the incident light 47 and also matching the phases of the incident light 47. The resulting incident light 47 is emitted toward a measurement object 43. Thus, it is possible to irradiate the measurement object 43 under a plurality of irradiation conditions. The adjustment of the planes of polarization refers to the fact that the light having passed through the polarizer 42 becomes light having one plane of polarization.

Reflected light 48, which has been obtained by the incident light 47 being reflected by the measurement object 43, is spatially separated by the spectroscopic optical system 44 according to the wavelengths. As the spectroscopic optical system 44, specifically, a prism or a diffraction grating can be used.

Separated light 49, which has been separated by the spectroscopic optical system 44, is detected by the photodetector 45. As the photodetector 45, a photodetector in which photoelectric conversion devices are arranged in an array is used. Based on the separated light 49 received by the photodetector 45 serving as a light receiving unit, the intensities and the phases of the S-polarized light and the P-polarized light are measured with respect to each wavelength, thereby obtaining the intensity ratio of the S-polarized light to the P-polarized light and the phase difference between the S-polarized light and the P-polarized light. Information of the intensity ratio and the phase difference that have been obtained is sent to a calculator 46 (a processing unit). The calculator 46 obtains the layer thickness of the measurement object 43 using the intensity ratio and the phase difference from the photodetector 45 and a relational expression described later. The calculator 46 outputs the obtained result as an estimated value of the layer thickness of the measurement object 43. The S-polarized light and the P-polarized light are separately measured using, for example, a polarizing beam splitter and a polarizer.

Next, a method is described of obtaining a relational expression between at least one of the intensity ratio and the phase difference, which are the detected values of the spectroscopic ellipsometer 200, and the residual layer thickness. To determine a coefficient of the relational expression, it is necessary to prepare the following two measured values.

The first measured value is measured values obtained by using a method other than the spectroscopic ellipsometer 200 to measure the RLTs of m residual layer measurement substrates. Examples of the method include a method of measuring the RLTs using a cross-sectional scanning electron microscope (SEM). This method cuts a wafer on which a pattern has been formed, and observes the cross section, and thereby can measure the cross-sectional shape of the pattern including the RLT. In this case, the method measures the residual layer thicknesses of m residual layer measurement substrates of which the residual layer thicknesses are different from one another. A residual layer measurement substrate is a substrate on which a pattern has been formed by the imprint apparatus 100. On the residual layer measurement substrate, a particular pattern for which the relational expression is to be obtained is formed. It is desirable that the residual layer measurement substrates should have the same conditions except for the residual layer thicknesses. The measured values of the residual layer thicknesses need to have been obtained as somewhat accurate values. Hereinafter, the measured values of the m residual layer thicknesses that have been obtained are considered as a column vector, which is expressed as t.

The second measured value is a measured value obtained by using the spectroscopic ellipsometer 200 to irradiate, with light, each of m residual layer measurement substrates of which the residual layer thicknesses of the recessed portions of the patterns formed by imprinting are different from one another, thereby measuring at least one of the phase difference and the intensity ratio of the reflected light (measurement-substrate-reflected light). This method irradiates each of the residual layer measurement substrates with incident light under n illumination conditions different from one another, thereby measuring n beams of reflected light. The case is described where the method irradiates each of the residual layer measurement substrates with beams of incident light of wavelengths different from one another, thereby measuring the phase difference. The measured value of the phase difference obtained by the spectroscopic ellipsometer 200 is data of a set of phase differences including n phase differences. The measured value is obtained by measuring the phase difference so as to correspond to each of the measured values of the m residual layer thicknesses.

Hereinafter, the measured values of a set of phase differences are considered as a row vector, and a matrix with m rows and n columns obtained by causing the row vector to correspond to the rows of the column vector t is expressed as D. Further, the measured values of the n phase differences included in each row of the matrix D are arranged in ascending order of wavelength used when the measured values have been obtained.

Next, a method is described of obtaining the relational expression representing the correlation between the residual layer thickness and the measured value of the phase difference. As described above, there are not necessarily correlations between the residual layer thickness of the substrate on which the pattern has been formed by the imprint apparatus 100, and the measured values of the phase differences at all the wavelengths. In response, a matrix P for selecting the measured value of the phase difference to be reflected on the relational expression representing the correlation to be obtained is defined. Then, a correlation coefficient between the column vector t and each column of the matrix D is calculated, the correlation coefficient serving as an indicator for selecting the measured value of the phase difference to be reflected on the relational expression. In this case, a single correlation coefficient is determined for each column of the matrix D, that is, for each wavelength.

Hereinafter, the measured value of the phase difference measured using light of a wavelength corresponding to a correlation coefficient having an absolute value close to "1" is employed. Thus, the columns other than the column including such a phase difference are removed from the matrix D. The thus newly obtained matrix is expressed as $\Delta$, and the number of columns of the matrix $\Delta$ is $n_0$ ($n \geq n_0$). At this time, the correspondences between the column numbers of the matrix $\Delta$ and the wavelengths are lost. That is, it becomes unclear what wavelength has been used to measure the phase difference included in each column of the matrix $\Delta$. In response, the correspondences between the column numbers of the matrix $\Delta$ and the wavelengths are defined by a matrix P with n rows and $n_0$ columns. That is, the fact that the phase difference included in a j-th column of the matrix $\Delta$ has been measured using a k-th shortest wavelength is represented by, among the components of the j-th column of the matrix P, setting a k-th row to 1 and the rows other than the k-th row to 0. In this case, $j=1, 2, \ldots, n_0$, and $k=1, 2, \ldots, n$. The thus-obtained matrix P is stored in the calculator 46.

Further, the coefficient to be used in the relational expression is determined. First, a matrix A is defined as:

$$A = (B\Delta)$$

In this case, B is a column vector of m 1's. Thus, the matrix A is a matrix with m rows and $(n_0+1)$ columns.

Next, a pseudoinverse matrix $A^+$ of the matrix A is calculated as:

$$A^+ = \begin{cases} ({}^tAA)^{-1}{}^tA & \text{if rank } A = n_0 + 1 \\ A^{-1} & \text{if rank } A = m = n_0 + 1 \\ {}^tA(A{}^tA)^{-1} & \text{if rank } A = m \end{cases}$$

In this case, ${}^tA$ is the transpose of the matrix A. It should be noted that the column vector t and the matrix D should be taken so that the matrix A or the matrix A is a regular matrix.

The coefficient of the relational expression is obtained by multiplying t by $A^+$ from the left, and is expressed as a. That is:

$$a = A^+ t$$

In this case, a is an $(n_0+1)$-dimensional column vector, and a is stored in the calculator 46.

Using P and a, the relational expression to be obtained can be represented as follows:

$$y = (1 {}^t x P) a$$

In this case, x is an n-dimensional column vector having as components the measured values of the phase differences of the reflected light from the measurement object irradiated with light. Then, y is the residual layer thickness of the measurement object. The calculation of the relational expression can be made by the calculator 46. Additionally, the relational expression may be stored in the memory 50 of the imprint apparatus 100. Further, the relational expression may be obtained and stored with respect to each type of pattern (aperiodic structure). Thus, it is possible to obtain the residual layer thickness using an optimal relational expression according to the pattern formed on the wafer 1. The obtained relationship may be stored in a host computer that manages the entire production, and an optimal relational expression may be transmitted, where appropriate, to the imprint apparatus 100 or the ellipsometer 200 for use.

As described above, with the use of the residual layer measurement substrates produced using a mold on which a particular pattern has been formed, a relational expression is obtained using, among the measured values of the phase differences of the reflected light from the substrates, the phase difference of the reflected light caused by the irradiation of light of a wavelength of which a correlation coefficient with the measured value of the residual layer thickness is close to 1. Using the thus obtained relationship, it is possible to obtain the residual layer thickness of a pattern (an aperiodic structure) formed using a particular mold.

The present exemplary embodiment describes the case of obtaining a relational expression from the residual layer thickness and the phase difference of the reflected light, and storing the relational expression in a control unit. A relational expression, however, does not necessarily need to be obtained. Alternatively, a particular wavelength corresponding to a correlation coefficient close to "1" may be determined, and a library of the phase differences with respect to the residual layer thicknesses may be created. The library is stored in the control unit and is referred to based on the measured value of the phase difference of the reflected light from the measurement object, whereby it is possible to obtain the residual layer thickness.

As illustrated in FIG. 1, the measuring device (the spectroscopic ellipsometer 200) and the imprint apparatus 100 can be different apparatuses. The imprint apparatus 100 and the spectroscopic ellipsometer 200 are connected to each other via the communication unit 500 and function as an imprint system.

In this case, a conveying unit (not illustrated) conveys the wafer 1 on which the pattern has been formed by the imprint apparatus 100 to the spectroscopic ellipsometer 200. The light source 41 irradiates the conveyed wafer 1 (a measurement object of which the residual layer thickness is unknown) with light, thereby measuring the phase difference of the reflected light. The residual layer thickness of the wafer 1 is obtained from the measured value and the relationship obtained in advance as described above. In this case, the pattern formed on the residual layer measurement substrate and the pattern formed on the measurement object are of the same type. It is desirable that the pattern on the residual layer measurement substrate and the pattern on the measurement object should be formed using the same mold.

The measurement of the residual layer thickness described in the present exemplary embodiment does not need to be made on all wafers. For example, the measurement may be made on the first wafer of a lot, or the measurement may be made on the first wafer after a condition for the imprint process has changed. The measurement may be made not on all shots but on several representative shots.

The residual layer thickness obtained by the spectroscopic ellipsometer 200 is transmitted to the imprint apparatus 100 and used to control the operation of the imprint apparatus 100 to obtain an appropriate residual layer thickness. The control unit 400 sets the operating condition of the imprint apparatus 100 based on information of the residual layer thickness measured using the spectroscopic ellipsometer 200.

For example, it is possible to change, as the operating condition of the imprint apparatus 100, the amount of resin to be supplied onto the wafer 1, by controlling the supply unit 30. Examples of the method of changing the amount of resin include a method of changing the amount of resin to be dripped on the wafer 1, and a method of changing the distance between drops of resin to be dripped. Alternatively, resin to be dripped in a shot area may have a distribution.

In the imprint technique, after a pattern has been formed in all shot areas on a wafer by an imprint apparatus, a residual layer in a recessed portion of the pattern is removed. Thus, the obtained residual layer thickness may be used to set the condition for etching for removing the residual layer. The wafer 1 onto which the pattern has been transferred is carried out of the imprint apparatus 100, and the residual layer thickness is obtained using the spectroscopic ellipsometer 200. After the residual layer thickness has been obtained, the wafer 1 onto which the pattern has been transferred is carried out of the spectroscopic ellipsometer 200 and carried into an apparatus (an etching apparatus) for removing the residual layer.

The measurement result including the obtained residual layer thickness is transmitted from the spectroscopic ellipsometer 200 to the etching apparatus via the communication unit 500. Based on the transmitted information of the residual layer thickness, the etching apparatus obtains the amount of removal of the residual layer from the wafer 1 onto which the pattern has been transferred. By obtaining an optimal amount for etching, it is possible to minimize the influence on the raised portion of the pattern transferred onto the resin on the wafer 1, and effectively remove the residual layer in the recessed portion. The imprint system may thus include the etching apparatus. By performing optimal etching using the obtained residual layer thickness, it is possible to reduce the nonuniformity of the pattern shape caused by the nonuniformity of the residual layer thickness.

The present exemplary embodiment describes the system including one imprint apparatus 100 and one spectroscopic ellipsometer 200. Alternatively, the imprint system may include a plurality of imprint apparatuses connected to an ellipsometer. Yet alternatively, the spectroscopic ellipsometer 200 may be provided in the imprint apparatus 100.

As described above, on a substrate on which a pattern has been formed using an imprint apparatus, the value of at least one of the phase difference between P-polarized light and S-polarized light and the intensity ratio of the P-polarized light to the S-polarized light as described above is measured using an ellipsometer, whereby it is possible to obtain the thickness of a residual layer on the substrate. The measured value may be a set of the phase difference and the intensity ratio.

The method of obtaining m layer thickness measured values necessary for determining the coefficient of the relational expression described above is not limited to a method using a cross-sectional SEM. For example, a layer thickness meter using electromagnetic induction or an eddy current can be used. In this case, however, each of the residual layer measurement substrates to be used to obtain m layer thickness measured values needs to have an area of only a residual layer that is large enough to allow the measurement using the layer thickness meter. Further, a certain relationship needs to have been ascertained between the residual layer thickness of the area and the residual layer thickness of an area having a particular pattern.

The above exemplary embodiment describes the case of using a spectroscopic ellipsometer for the measurement. Alternatively, for example, an ellipsometer using a light source (laser) that emits single-wavelength light may be used. In this case, an ellipsometer capable of changing the angle of incidence of the light on the measurement object is used. Further, a device is described to measure the phase difference of light to obtain a relational expression. Alternatively, the intensity ratio of light may be measured, or both the phase difference and the intensity ratio may be measured.

As a substrate, a silicon wafer or a glass plate can be used. Further, in the above exemplary embodiment, a light-curable resin is used as the imprint material. The exemplary embodiment is not limited to imprinting by a light-curing method, and may be imprinting by a thermal cycling method. The thermal cycling method presses a mold against thermoplastic resin heated to a temperature at or above a glass-transition temperature, cools the resin, and thereafter pulls the mold away from the resin, thereby forming a pattern.

The above exemplary embodiment describes the case where a pattern to be formed on a substrate is formed by imprinting. A pattern to be formed on a substrate, however, may not necessarily be formed by imprinting. Also when, after a pattern has been formed on a substrate using a lithography apparatus different from an imprint apparatus, a residual layer remains in a recessed portion of the pattern, it is possible to obtain the residual layer thickness using the measuring apparatus described above.

A method of manufacturing a device as an article (a semiconductor integrated circuit device or a liquid crystal display device) includes the step of forming a pattern on a substrate (a wafer, a glass plate, or a film substrate) using the imprint apparatus described above. Further, this manufacturing method can include the step of etching the substrate on which the pattern has been formed. To manufacture another article such as a patterned medium (a recording medium) or an optical element, the manufacturing method can include, instead of the etching step, another process of processing the substrate on which the pattern has been formed. The article manufacturing method according to the present exemplary embodiment has an advantage over a conventional method in at least one of performance, quality, productivity, and production costs.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-263515 filed Nov. 30, 2012, which is hereby incorporated by reference herein in its entirety.

What is claimed is:

1. A measuring apparatus for, based on a characteristic of reflected light obtained by irradiating with light a pattern formed on a substrate, obtaining a thickness of a residual layer in a recessed portion of the pattern formed on the substrate, the measuring apparatus comprising:

a storage unit configured to store a relationship, regarding an irradiation condition based on a correlation between a characteristic of each of beams of reflected light from a plurality of patterns different from one another in a thickness of a residual layer in a recessed portion and the thickness of the residual layer of each of the plurality of patterns, between the characteristic of the reflected light from each pattern and the thickness of the residual layer of the pattern; and a processing unit configured to, based on a characteristic of the reflected light from the pattern formed on the substrate irradiated with light under the irradiation condition and the relationship stored in the storage unit, obtain the thickness of the residual layer in the recessed portion of the pattern formed on the substrate.

2. The measuring apparatus according to claim 1, wherein the irradiation condition includes a wavelength of the light or an angle of incidence of the light.

3. The measuring apparatus according to claim 1, wherein the processing unit obtains the thickness of the residual layer using as the characteristic an intensity of the reflected light, an intensity ratio of P-polarized light to S-polarized light, or a phase difference between the P-polarized light and the S-polarized light, the P-polarized light and the S-polarized light being included in the reflected light.

4. The measuring apparatus according to claim 1, wherein the storage unit stores as the relationship a coefficient of an expression for obtaining the thickness of the residual layer from the characteristic, or information indicating a correspondence relationship between the characteristic and the thickness of the residual layer.

5. The measuring apparatus according to claim 1, wherein the pattern formed on the substrate is a pattern formed by imprinting.

6. The measuring apparatus according to claim 1, wherein the irradiation condition includes a wavelength of the light or an angle of incidence of the light,
wherein the characteristic of reflected light from the plurality of patterns is a measured value obtained by measuring at least one of a phase difference and an intensity ratio of the reflected light, and
wherein the storage unit obtains a correlation coefficient between the characteristic of reflected light from the plurality of patterns and the thickness of the residual layer of the pattern under each of the different irradiation conditions, and stores a relationship between the characteristic of the reflected light from the pattern and the thickness of the residual layer of the pattern regarding the irradiation condition under which the correlation coefficient is close to 1.

7. An imprint system comprising:
an imprint apparatus for forming a pattern on a substrate using a mold; and
a measuring apparatus for obtaining a thickness of a residual layer in a recessed portion of the pattern formed by the imprint apparatus,
wherein the measuring apparatus obtains, based on a characteristic of each of beams of reflected light obtained by irradiating with light a pattern formed by the imprint apparatus, a thickness of a residual layer in a recessed portion of the pattern formed by the imprint apparatus, the measuring apparatus comprising:
a storage unit configured to store a relationship, regarding an irradiation condition based on a correlation between a characteristic of reflected light from a plurality of patterns different from one another in a thickness of a residual layer in a recessed portion and the thickness of the residual layer of each of the plurality of patterns, between the characteristic of the reflected light from each pattern and the thickness of the residual layer of the pattern; and
a processing unit configured to, based on a characteristic of the reflected light from the pattern formed by the imprint apparatus on the substrate irradiated with light under the irradiation condition and the relationship stored in the storage unit, obtain the thickness of the residual layer in the recessed portion of the pattern formed by the imprint apparatus.

8. The imprint system according to claim 7, wherein the imprint system controls the imprint apparatus based on information of the thickness of the residual layer obtained by the measuring apparatus.

9. The imprint system according to claim 7, further comprising an etching apparatus for removing the residual layer in the recessed portion of the pattern formed by the imprinting apparatus,
wherein, based on information of the thickness of the residual layer obtained by the measuring apparatus, the etching apparatus removes the residual layer in the recessed portion of the pattern formed by the imprint apparatus.

10. A method of, based on a characteristic of reflected light obtained by irradiating with light a pattern formed on a substrate, obtaining a thickness of a residual layer in a recessed portion of the pattern formed on the substrate, the method comprising:
obtaining a relationship, regarding an irradiation condition based on a correlation between a characteristic of each of beams of reflected light from a plurality of patterns different from one another in a thickness of a residual layer in a recessed portion and the thickness of the residual layer of each of the plurality of patterns, between the characteristic of the reflected light from each pattern and the thickness of the residual layer of the pattern; and
obtaining, based on a characteristic of the reflected light from the pattern formed on the substrate irradiated with light under the irradiation condition and the relationship, the thickness of the residual layer in the recessed portion of the pattern formed on the substrate.

11. The method according to claim 10, wherein the irradiation condition includes a wavelength of the light or an angle of incidence of the light.

12. The method according to claim 10, wherein the irradiation condition is selected based on the correlation obtained under, among a plurality of irradiation conditions, each of the plurality of irradiation conditions.

13. The method according to claim 10, wherein an intensity of the reflected light, an intensity ratio of P-polarized light to S-polarized light, or a phase difference between the P-polarized light and the S-polarized light is used as the characteristic, the P-polarized light and the S-polarized light being included in the reflected light.

14. The method according to claim 10, wherein the thickness of the residual layer in the recessed portion of each of the plurality of patterns different from one another in the thickness of the residual layer in the recessed portion is measured using a cross-sectional SEM.

15. The method according to claim 10, wherein a coefficient of an expression for obtaining the thickness of the residual layer in the recessed portion from the characteristic, or information indicating a correspondence relationship between the characteristic and the thickness of the residual layer in the recessed portion is obtained as the relationship.

16. A device manufacturing method comprising:
forming a pattern on a substrate using an imprint system; and
processing the substrate on which the pattern has been formed,
wherein the imprint system comprising:
an imprint apparatus for forming a pattern on a substrate using a mold; and
a measuring apparatus for obtaining a thickness of a residual layer in a recessed portion of the pattern formed by the imprint apparatus,
wherein the measuring apparatus obtains, based on a characteristic of each of beams of reflected light obtained by irradiating with light a pattern formed by the imprint apparatus, a thickness of a residual layer in a recessed portion of the pattern formed by the imprint apparatus, the measuring apparatus comprising:

a storage unit configured to store a relationship, regarding an irradiation condition based on a correlation between a characteristic of reflected light from a plurality of patterns different from one another in a thickness of a residual layer in a recessed portion and the thickness of the residual layer of each of the plurality of patterns, between the characteristic of the reflected light from each pattern and the thickness of the residual layer of the pattern; and a processing unit configured to, based on a characteristic of the reflected light from the pattern formed by the imprint apparatus on the substrate irradiated with light under the irradiation condition and the relationship stored in the storage unit, obtain the thickness of the residual layer in the recessed portion of the pattern formed by the imprint apparatus.

* * * * *